(12) United States Patent
Byun et al.

(10) Patent No.: US 9,012,050 B2
(45) Date of Patent: *Apr. 21, 2015

(54) RECHARGEABLE BATTERY

(75) Inventors: Sangwon Byun, Yongin-si (KR);
Jeongwon Oh, Yongin-si (KR);
Haekwon Yoon, Yongin-si (KR);
Minyeol Han, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 484 days.

This patent is subject to a terminal disclaimer.

(21) Appl. No.: 13/333,869

(22) Filed: Dec. 21, 2011

(65) Prior Publication Data

US 2013/0029191 A1  Jan. 31, 2013

(30) Foreign Application Priority Data

Jul. 26, 2011 (KR) ........................ 10-2011-0073880

(51) Int. Cl.
| | |
|---|---|
| *H01M 2/12* | (2006.01) |
| *H01M 10/34* | (2006.01) |
| *H01M 10/52* | (2006.01) |
| *H01M 2/34* | (2006.01) |
| *H01M 2/02* | (2006.01) |
| *H01M 2/04* | (2006.01) |
| *H01M 2/30* | (2006.01) |
| H01M 10/0525 | (2010.01) |

(52) U.S. Cl.
CPC .............. *H01M 2/345* (2013.01); *H01M 2/024* (2013.01); *H01M 2/043* (2013.01); *H01M 2/305* (2013.01); H01M 10/0525 (2013.01); Y02T 10/7011 (2013.01)

(58) Field of Classification Search
USPC ............................................... 429/56, 59, 61
See application file for complete search history.

(56) References Cited

U.S. PATENT DOCUMENTS

| | | | |
|---|---|---|---|
| 4,209,571 A | 6/1980 | Bessett et al. | |
| 4,945,014 A | 7/1990 | Miyabayashi et al. | |

(Continued)

FOREIGN PATENT DOCUMENTS

| | | |
|---|---|---|
| CN | 1395328 A | 2/2003 |
| CN | 1481039 A | 3/2004 |

(Continued)

OTHER PUBLICATIONS

KIPO Office action dated Nov. 20, 2012, for Korean priority Patent application 10-2011-0073880, (8 pages).

(Continued)

*Primary Examiner* — Patrick Ryan
*Assistant Examiner* — Julian Anthony
(74) *Attorney, Agent, or Firm* — Christie, Parker & Hale, LLP

(57) ABSTRACT

A rechargeable battery including an electrode assembly; a case housing the electrode assembly; a cap assembly including a cap plate having a short-circuit hole and sealing an opening of the case; and a short-circuiting member including a short-circuiting plate arranged at the short-circuit hole and a connection plate covering at least a portion of the short-circuit hole at an exterior side, the connection plate being spaced apart from the cap plate and electrically connected to the electrode assembly, and the case and the cap assembly are electrically insulated from the electrode assembly.

17 Claims, 8 Drawing Sheets

(56) References Cited

U.S. PATENT DOCUMENTS

| | | |
|---|---|---|
| 5,143,860 A | 9/1992 | Mitchell et al. |
| 5,523,178 A | 6/1996 | Murakami et al. |
| 5,707,756 A | 1/1998 | Inoue et al. |
| 5,766,793 A | 6/1998 | Kameishi et al. |
| 5,800,937 A | 9/1998 | Decker et al. |
| 6,005,469 A | 12/1999 | Kalapodis et al. |
| 6,083,792 A | 7/2000 | Sung |
| 6,143,440 A | 11/2000 | Volz et al. |
| 6,342,826 B1 | 1/2002 | Quinn et al. |
| 6,399,237 B1 | 6/2002 | Souliac et al. |
| 6,403,250 B1 | 6/2002 | Azema et al. |
| 6,509,115 B2 | 1/2003 | Kim et al. |
| 6,525,371 B2 | 2/2003 | Johnson et al. |
| 6,562,493 B2 | 5/2003 | Tsukada et al. |
| 6,642,110 B2 | 11/2003 | Jung et al. |
| 6,753,104 B2 | 6/2004 | Kitoh |
| 6,899,972 B2 | 5/2005 | Cho |
| 7,351,496 B2 | 4/2008 | Nakanishi et al. |
| 7,601,455 B2 | 10/2009 | Yoon |
| 7,666,544 B2 | 2/2010 | Barrault et al. |
| 8,043,737 B2 | 10/2011 | Kim |
| 8,236,439 B2 * | 8/2012 | Byun et al. ............ 429/59 |
| 8,415,052 B2 | 4/2013 | Yoshida et al. |
| 2002/0052080 A1 | 5/2002 | Lee |
| 2002/0142543 A1 | 10/2002 | Lin et al. |
| 2003/0013005 A1 | 1/2003 | Chang |
| 2003/0027036 A1 | 2/2003 | Emori et al. |
| 2003/0027044 A1 | 2/2003 | Asahina et al. |
| 2003/0151868 A1 | 8/2003 | Inae et al. |
| 2004/0092167 A1 | 5/2004 | Barrault et al. |
| 2004/0126650 A1 | 7/2004 | Kim |
| 2004/0170887 A1 | 9/2004 | Masumoto et al. |
| 2004/0234842 A1 | 11/2004 | Kawano et al. |
| 2005/0112455 A1 | 5/2005 | Marubayashi et al. |
| 2005/0112456 A1 | 5/2005 | Kozu et al. |
| 2005/0124133 A1 | 6/2005 | Tu |
| 2005/0269622 A1 | 12/2005 | Klinger et al. |
| 2006/0099500 A1 | 5/2006 | Jeon |
| 2007/0077706 A1 | 4/2007 | Orlowski et al. |
| 2007/0122691 A1 | 5/2007 | Lee et al. |
| 2007/0166605 A1 | 7/2007 | Meguro et al. |
| 2007/0182020 A1 | 8/2007 | Trezza et al. |
| 2007/0212595 A1 | 9/2007 | Kim et al. |
| 2007/0269711 A1 | 11/2007 | Meguro et al. |
| 2008/0070067 A1 | 3/2008 | Jang et al. |
| 2008/0145748 A1 | 6/2008 | Jung |
| 2008/0213657 A1 | 9/2008 | Qi et al. |
| 2009/0087733 A1 | 4/2009 | Yoon et al. |
| 2009/0305126 A1 | 12/2009 | Choi et al. |
| 2010/0028762 A1 | 2/2010 | Yokoyama et al. |
| 2010/0081048 A1 | 4/2010 | Nansaka et al. |
| 2010/0136388 A1 | 6/2010 | Kim et al. |
| 2010/0167107 A1 | 7/2010 | Byun et al. |
| 2010/0227205 A1 | 9/2010 | Byun et al. |
| 2010/0279156 A1 | 11/2010 | Kim et al. |
| 2010/0291421 A1 | 11/2010 | Byun et al. |
| 2011/0039136 A1 | 2/2011 | Byun et al. |
| 2011/0135976 A1 | 6/2011 | Byun |
| 2011/0136004 A1 | 6/2011 | Kwak et al. |
| 2011/0177387 A1 | 7/2011 | Byun et al. |
| 2011/0183193 A1 | 7/2011 | Byun et al. |
| 2011/0244280 A1 | 10/2011 | Byun et al. |

FOREIGN PATENT DOCUMENTS

| | | |
|---|---|---|
| EP | 0 313 405 A1 | 4/1989 |
| EP | 1 076 350 A2 | 2/2001 |
| EP | 1 717 886 A2 | 11/2006 |
| EP | 1 901 369 A1 | 3/2008 |
| EP | 2 284 932 A1 | 2/2011 |
| EP | 2 287 942 A1 | 2/2011 |
| EP | 2 299 512 A1 | 3/2011 |
| EP | 2 333 871 A1 | 6/2011 |
| EP | 2 348 558 A1 | 7/2011 |
| EP | 2 357 685 A1 | 8/2011 |
| JP | 05-062664 | 3/1993 |
| JP | 05-251290 | 9/1993 |
| JP | 05-275088 | 10/1993 |
| JP | 06-290767 | 10/1994 |
| JP | 07-037572 | 2/1995 |
| JP | 07-201372 | 8/1995 |
| JP | 08-050920 | 2/1996 |
| JP | 08-185850 | 7/1996 |
| JP | 09-106804 | 4/1997 |
| JP | 10-074500 | 3/1998 |
| JP | 10-188946 | 7/1998 |
| JP | 10-208725 | 8/1998 |
| JP | 10-326610 | 12/1998 |
| JP | 11-007931 | 1/1999 |
| JP | 11-040203 | 2/1999 |
| JP | 11-273651 | 10/1999 |
| JP | 11-307076 | 11/1999 |
| JP | 2000-082457 | 3/2000 |
| JP | 2000-182598 | 6/2000 |
| JP | 2001-202946 | 7/2001 |
| JP | 2001-357834 | 12/2001 |
| JP | 2002-216743 | 8/2002 |
| JP | 2003-051303 | 2/2003 |
| JP | 2003-051304 | 2/2003 |
| JP | 2003-092103 | 3/2003 |
| JP | 2003-178745 | 6/2003 |
| JP | 2003-197178 | 7/2003 |
| JP | 2003-223886 | 8/2003 |
| JP | 2003-308815 | 10/2003 |
| JP | 2004-022477 | 1/2004 |
| JP | 2004-087194 | 3/2004 |
| JP | 2004-521459 | 7/2004 |
| JP | 2004-273139 | 9/2004 |
| JP | 2004-319463 | 11/2004 |
| JP | 2005-032477 | 2/2005 |
| JP | 2005-044626 | 2/2005 |
| JP | 2005-166584 | 6/2005 |
| JP | 2006-012602 | 1/2006 |
| JP | 2006-147180 | 6/2006 |
| JP | 2008-27668 | 2/2008 |
| JP | 2008-177084 | 7/2008 |
| JP | 2008-186591 | 8/2008 |
| JP | 2008-218132 | 9/2008 |
| JP | 2009-105075 | 5/2009 |
| JP | 2010-033777 | 2/2010 |
| JP | 2010-097822 | 4/2010 |
| JP | 2011-018645 | 1/2011 |
| JP | 2011-124214 | 6/2011 |
| JP | 2011-154991 | 8/2011 |
| JP | 2011-210717 | 10/2011 |
| KR | 20-1999-0031054 U | 7/1999 |
| KR | 10-2001-0011900 | 2/2001 |
| KR | 10-2001-0021236 | 3/2001 |
| KR | 10-2006-0020211 | 3/2006 |
| KR | 10-2006-0039955 | 5/2006 |
| KR | 10-0693115 B1 | 3/2007 |
| KR | 10-2007-0122471 | 12/2007 |
| KR | 10-0870349 B1 | 11/2008 |
| KR | 10-2009-0097599 | 9/2009 |
| KR | 10-2010-0036164 | 4/2010 |
| KR | 10-2010-0052885 | 5/2010 |
| KR | 10-2010-0062886 | 6/2010 |
| KR | 10-2010-0076699 | 7/2010 |
| KR | 10-2010-0088021 | 8/2010 |
| KR | 10-2010-0099983 | 9/2010 |
| KR | 10-2010-0123598 | 11/2010 |
| KR | 10-2011-0005197 | 1/2011 |
| KR | 10-2011-0017820 | 2/2011 |
| KR | 10-2011-0030043 | 3/2011 |
| KR | 10-1042808 B1 | 6/2011 |
| KR | 10-2011-0136166 | 12/2011 |
| WO | WO 02/071510 A1 | 9/2002 |
| WO | WO 2007/126243 A1 | 11/2007 |

OTHER PUBLICATIONS

SIPO Office action dated Oct. 8, 2014, with English translation, for corresponding Chinese Patent application 201110207662.2, (18 pages).

(56) References Cited

OTHER PUBLICATIONS

U.S. Notice of Allowability dated Aug. 19, 2014, for cross reference U.S. Appl. No. 12/781,656, (2 pages).
U.S. Notice of Allowance dated Aug. 28, 2014, for cross reference U.S. Appl. No. 13/563,028, (9 pages).
U.S. Office action dated Oct. 16, 2014, for cross reference U.S. Appl. No. 12/626,582, (18 pages).
U.S. Office action dated Oct. 21, 2014, for cross reference U.S. Appl. No. 13/396,463, (27 pages).
KIPO Office action dated Jan. 17, 2012 for Korean Patent application 10-2010-0068019, (9 pages).
KIPO Office action dated Mar. 19, 2012 for Korean Patent application 10-2010-0062270, (5 pages).
KIPO Office action dated Jun. 18, 2012 for Korean Patent application 10-2011-0003951, (4 pages).
KIPO Office action dated Aug. 13, 2012 for Korean Patent application 10-2011-0036267, (4 pages).
KIPO Office action dated Oct. 8, 2012, for Korean Patent application 10-2011-0050510, (4 pages).
KIPO Office action dated Apr. 4, 2012, for Korean Patent application 10-2010-0062874, (5 pages).
KIPO Notice of Allowance dated Oct. 26, 2012, for Korean Patent application 10-2010-0052011, (5 pages).
KIPO Notice of Allowance dated Dec. 4, 2012, for Korean Patent application 10-2011-0003951, (5 pages).
KIPO Notice of Allowance dated Mar. 27, 2013, for Korean Patent application 10-2011-0050510, (5 pages).
KIPO Letters Patent dated Dec. 15, 2011, for Korean Patent application 10-2009-0116065, (11 pages).
EPO Search Report dated Aug. 16, 2010 for European Patent application 101685263.1, (6 pages).
EPO Search Report dated Aug. 19, 2010 for European Patent application 10164550.5, (8 pages).
EPO Search Report dated Aug. 19, 2010 for European Patent application 10167890.2, (7 pages).
EPO Search Report dated Oct. 13, 2010 for European Patent application 10169791, (6 pages).
EPO Search Report dated Dec. 14, 2012 for European Patent application 12160354.2, (5 pages).
EPO Search Report dated Sep. 29, 2011 for European Patent application 11169286.9, (5 pages).
EPO Search Report dated Feb. 29, 2012 for European Patent application 11165265.7, (5 pages).
EPO Search Report dated Sep. 28, 2012 for European Patent application 12179697.3, (6 pages).
EPO Search Report dated Oct. 2, 2012 for European Patent application 11178263.7, (7 pages).
EPO Search Report dated Dec. 20, 2012 for European Patent application 12178835.0, (6 pages).
EPO Office action dated Feb. 8, 2011 for European Patent application 10168526.1, (4 pages).
EPO Office action dated Mar. 7, 2011 for European Patent application 10164550.5, (5 pages).
EPO Office action dated Apr. 21, 2011 for European Patent application 10169791, (6 pages).
EPO Office action dated Jul. 19, 2011 for European Patent application 10170406.2 (3 pages).
EPO Office action dated Apr. 20, 2011 for European Patent application 10167890.2, (6 pages).
EPO Office action dated Aug. 17, 2011 for European Patent application 10164550.5, (8 pages).
EPO Office action dated Mar. 22, 2012 for European Patent application 101164550.5 (4 pages).
EPO Office action dated Jul. 27, 2012 for European Patent application 10164550.5 (5 pages).
JPO Office action dated Aug. 28, 2012, for Japanese Patent application 2010-170281, (2 pages).
JPO Office action dated Feb. 5, 2013, for Japanese Patent application 2010-154142, (2 pages).
JPO Office action dated Apr. 30, 2013, for Japanese Patent application 2011-115662, (2 pages).
JPO Office action dated Jun. 4, 2013, for Japanese Patent application 2011-170959, (3 pages).
JPO Office action dated Sep. 24, 2013, for Japanese Patent application 2011-170959, (3 pages).
SIPO Office action dated Jan. 22, 2013, with English translation for Chinese Patent application 201010220632.0, (20 pages).
SIPO Office action dated Apr. 12, 2013, with English translation, for Chinese Patent application 201010135715.X, (20 pages).
SIPO Office action dated Aug. 6, 2013, with English translation for Chinese Patent application 201010135715.X, (20 pages).
SIPO Office action dated Jul. 15, 2013, with English translation for Chinese Patent application 201010220632.0, (10 pages).
SIPO Office action dated Dec. 4, 2013, with English translation for Chinese Patent application 201110207662.2, (20 pages).
SIPO Office action dated Aug. 27, 2012, with English translation, for Chinese Patent application 201010135715.X, (16 pages).
SIPO Office action dated May 19, 2014, with English translation, for Chinese Patent application 201110207662.2, (16 pages).
Korean Patent Abstracts for Korean Publication 10-2008-0084416 dated Sep. 19, 2008, corresponding to Korean Patent 10-0870349 dated Nov. 25, 2008, listed above.
U.S. Notice of Allowance dated Sep. 23, 2013, for cross reference U.S. Appl. No. 13/210,124, (15 pages).
U.S. Notice of Allowance dated Jan. 29, 2014, for cross reference U.S. Appl. No. 12/781,656, (7 pages).
U.S. Notice of Allowance dated Mar. 20, 2014, for cross reference U.S. Appl. No. 12/781,656, (14 pages).
U.S. Notice of Allowance dated Apr. 30, 2014, for cross reference U.S. Appl. No. 13/563,028, (27 pages).
U.S. Notice of Allowance dated Apr. 13, 2012, for cross reference U.S. Appl. No. 12/634,000, (10 pages).
U.S. Notice of Allowance dated Jun. 27, 2014, for cross reference U.S. Appl. No. 12/781,656, (7 pages).
U.S. Office action dated Jun. 4, 2014, for cross reference U.S. Appl. No. 13/077,640, (25 pages).
U.S. Office action dated Jun. 21, 2013, for cross reference U.S. Appl. No. 13/137,460, (25 pages).
U.S. Office action dated Dec. 21, 2012, for cross reference U.S. Appl. No. 12/656,085, (28 pages).
U.S. Office action dated May 6, 2013, for cross reference U.S. Appl. No. 13/077,640, (17 pages).
U.S. Office action dated Aug. 17, 2010, for cross reference U.S. Appl. No. 12/626,582, (11 pages).
U.S. Office action dated Nov. 23, 2010, for cross reference U.S. Appl. No. 12/626,582, (10 pages).
U.S. Office action dated Feb. 1, 2013, for cross reference U.S. Appl. No. 12/781,656, (17 pages).
U.S. Office action dated Jul. 3, 2013, for cross reference U.S. Appl. No. 12/781,656, (15 pages).
U.S. Office action dated Oct. 8, 2013, for cross reference U.S. Appl. No. 13/563,028, (16 pages).
U.S. Office action dated Oct. 1, 2013, for cross reference U.S. Appl. No. 13/396,463, (15 pages).
U.S. Office action dated Nov. 21, 2013, for cross reference U.S. Appl. No. 13/077,640, (16 pages).
U.S. Office action dated Nov. 14, 2013, for cross reference U.S. Appl. No. 12/781,656, (20 pages).
U.S. Office action dated Apr. 8, 2014, for cross reference U.S. Appl. No. 13/396,463, (7 pages).
U.S. Office action dated May 20, 2014, for cross reference U.S. Appl. No. 12/626,582, (26 pages).
U.S. Office action dated May 6, 2011, for cross reference U.S. Appl. No. 12/634,000, (9 pages).
U.S. Office action dated Sep. 2, 2011, for cross reference U.S. Appl. No. 12/634,000, (14 pages).
U.S. Office action dated Jan. 9, 2012, for cross reference U.S. Appl. No. 12/634,000, (11 pages).
Patent Abstracts of Japan, and English machine translation of Japanese Publication 05-062664, dated Mar. 12, 1993, (11 pages).
Patent Abstracts of Japan, and English machine translation of Japanese Publication 05-251290, dated Sep. 28, 1993, (5 pages).

(56) References Cited

OTHER PUBLICATIONS

Patent Abstracts of Japan, and English machine translation of Japanese Publication 05-275088, dated Oct. 22, 1993, (6 pages).
Patent Abstracts of Japan, and English machine translation of Japanese Publication 06-290767, dated Oct. 18, 1994, (13 pages).
Patent Abstracts of Japan, and English machine translation of Japanese Publication 07-037572, dated Feb. 7, 1995, (5 pages).
Patent Abstracts of Japan, and English machine translation of Japanese Publication 07-201372, dated Aug. 4, 1995, (5 pages).
Patent Abstracts of Japan, and English machine translation of Japanese Publication 08-050920, dated Feb. 20, 1996, (14 pages).
Patent Abstracts of Japan, and English machine translation of Japanese Publication 08-185850, dated Jul. 16, 1996, (11 pages), also Corresponds to U.S. Patent 6,753,104 listed above.
Patent Abstracts of Japan, and English machine translation of Japanese Publication 10-188946, dated Jul. 21, 1998, (8 pages), also Corresponds to U.S. Patent 7,666,544 listed above.
Patent Abstracts of Japan, and English machine translation of Japanese Publication 10-208725, Aug. 7, 1998, (10 pages).
Patent Abstracts of Japan, and English machine translation of Japanese Publication 10-326610, dated Dec. 8, 1998 (10 pages).
Patent Abstracts of Japan, and English machine translation of Japanese Publication 11-040203, Feb. 12, 1999, (12 pages).
Patent Abstracts of Japan, and English machine translation of Japanese Publication 11-273651, Oct. 8, 1999, (12 pages).
Patent Abstracts of Japan, and English machine translation of Japanese Publication 11-307076, dated Nov. 5, 1999, (6 pages).
Patent Abstracts of Japan, and English machine translation of Japanese Publication 2000-082457, Mar. 21, 2000, (13 pages).
Patent Abstracts of Japan, and English machine translation of Japanese Publication 2000-182598, dated Jun. 30, 2000, (21 pages).
Patent Abstracts of Japan, and English machine translation of Japanese Publication 2001-202946, dated Jul. 27, 2001, (8 pages).
Patent Abstracts of Japan, and English machine translation of Japanese Publication 2001-357834, dated Dec. 26, 2001, (15 pages).
Patent Abstracts of Japan, and English machine translation of Japanese Publication 2002-216743, dated Aug. 2, 2002, (10 pages).
Patent Abstracts of Japan, and English machine translation of Japanese Publication 2003-051304, dated Feb. 21, 2003, (19 pages).
Patent Abstracts of Japan, and English machine translation of Japanese Publication 2003-092103, dated Mar. 28, 2003, (18 pages).
Patent Abstracts of Japan, and English machine translation of Japanese Publication 2003-197178 dated Jul. 11, 2003, (12 pages).
Patent Abstracts of Japan, and English machine translation of Japanese Publication 2003-223886, dated Aug. 8, 2003 , (10 pages).
Patent Abstracts of Japan, and English machine translation of Japanese Publication 2004-022477, Jan. 22, 2004, (7 pages).
Patent Abstracts of Japan, and English machine translation of Japanese Publication 2004-087194, Mar. 18, 2004, (10 pages).
Patent Abstracts of Japan, and English machine translation of Japanese Publication 2004-273139, Sep. 30, 2004, (24 pages).
Patent Abstracts of Japan, and English machine translation of Japanese Publication 2004-319463, Nov. 11, 2004, (13 pages).
Patent Abstracts of Japan, and English machine translation of Japanese Publication 2005-032477, dated, Feb. 3, 2005, (11 pages).
Patent Abstracts of Japan, and English machine translation of Japanese Publication 2005-044626, dated Feb. 17, 2005, (21 pages).
Patent Abstracts of Japan, and English machine translation of Japanese Publication 2006-012602, dated Jan. 12, 2006, (10 pages).
Patent Abstracts of Japan, and English machine translation of Japanese Publication 2008-027668, dated Feb. 7, 2008, (13 pages).
Patent Abstracts of Japan, and English machine translation of Japanese Publication 2008-177084, dated Jul. 31, 2008, (11 pages).
Patent Abstracts of Japan, and English machine translation of Japanese Publication 2008-186591, Aug. 14, 2008, (14 pages).
Patent Abstracts of Japan, and English machine translation of Japanese Publication 2008-218132, Sep. 18, 2008, (10 pages).
Patent Abstracts of Japan, and English machine translation of Japanese Publication 2009-105075, dated May 14, 2009, (10 pages).
Patent Abstracts of Japan, and English machine translation of Japanese Publication 2010-033777, Feb. 12, 2010, (16 pages).
Patent Abstracts of Japan, and English machine translation of Japanese Publication 2010-097822, dated Apr. 30, 2010, (24 pages).
Patent Abstracts of Japan, and English machine translation of Japanese Publication 2011-018645, dated Jan. 27, 2011, (15 pages).
U.S. Notice of Allowance dated Dec. 4, 2014, for cross reference U.S. Appl. No. 13/563,028, (9 pages).
U.S. Office action dated Nov. 24, 2014, for cross reference U.S. Appl. No. 13/077,640, (18 pages).

* cited by examiner

RECHARGEABLE BATTERY

CROSS-REFERENCE TO RELATED APPLICATION

This application claims priority to and the benefit of Korean Patent Application No. 10-2011-0073880, filed on Jul. 26, 2011 in the Korean Intellectual Property Office, the entire content of which is incorporated herein by reference.

BACKGROUND

1. Field

Aspects of embodiments of the present invention relate to a rechargeable battery.

2. Description of the Related Art

Generally, unlike a primary battery which is not rechargeable, a rechargeable battery is capable of being charged and discharged. A low-capacity rechargeable battery composed of a single battery cell may be used as a power source for various small portable electronic devices, e.g., cellular phones and camcorders. A high-capacity rechargeable battery in which a plurality of battery cells are connected to each other in a pack structure may be used as a power source, such as for driving a motor of an electric vehicle or a hybrid electric vehicle.

Rechargeable batteries may be manufactured in various shapes. Generally, rechargeable batteries may be classified as a cylindrical-shaped battery or a prismatic-shaped battery, for example. The rechargeable battery is formed such that an electrode assembly formed by disposing a separator as an insulator between positive and negative electrode plates, and an electrolyte are accommodated in a case. A cap assembly having electrode terminals may then be provided on the case.

When excess heat is generated, such as due to over-charge or when an electrolyte is decomposed, the internal pressure of a rechargeable battery may increase, resulting in fire or explosion. Accordingly, there is a need for a rechargeable battery configured to improve safety.

SUMMARY

According to an aspect of embodiments of the present invention, a rechargeable battery is capable of preventing or substantially preventing the internal pressure from excessively rising and having improved safety against a short due to external factors, such that an internal short is caused to operate a fuse when the internal pressure of the rechargeable battery increases.

According to an embodiment of the present invention, a rechargeable battery includes: an electrode assembly; a case housing the electrode assembly; a cap assembly including a cap plate having a short-circuit hole and sealing an opening of the case; and a short-circuiting member including a short-circuiting plate arranged at the short-circuit hole and a connection plate covering at least a portion of the short-circuit hole at an exterior side, the connection plate being spaced apart from the cap plate and electrically connected to the electrode assembly, and the case and the cap assembly are electrically insulated from the electrode assembly.

The electrode assembly may include a first electrode plate and a second electrode plate, the short-circuiting member may be a first short-circuiting member arranged at one side of the cap plate, and the rechargeable battery may further include a second short-circuiting member arranged at an opposite side of the cap plate.

The short-circuiting plate may be brought into contact with the connection plate when an internal pressure of the rechargeable battery exceeds a reference pressure.

In addition, the short-circuiting plate may be an invertible plate including a round part convexly extended toward the electrode assembly and an edge part fixed to the cap plate.

The rechargeable battery may further include an upper insulation member between the connection plate and the cap plate and including an open region corresponding to the short-circuit hole.

The short-circuiting plate is brought into surface contact with the connection plate when an internal pressure of the rechargeable battery exceeds a reference pressure.

A surface of the connection plate contacting the short-circuiting plate may be concave or planar.

The rechargeable battery may further include at least one fuse part arranged at a current flow passage of the rechargeable battery.

According to another embodiment of the present invention, a rechargeable battery includes: an electrode assembly including a first electrode plate and a second electrode plate; a case housing the electrode assembly; a cap assembly including a cap plate including a first electrode terminal electrically connected to the first electrode plate, a second electrode terminal electrically connected to the second electrode plate, a first short-circuit hole, and a second short-circuit hole, the cap plate sealing an opening of the case and being electrically insulated from the first electrode terminal and the second electrode terminal; a first short-circuiting member including a first short-circuiting plate arranged at the first short-circuit hole and a first connection plate covering at least a portion of the first short-circuit hole at an exterior side, the first connection plate being spaced apart from the cap plate and electrically connected to the first electrode terminal; and a second short-circuiting member including a second short-circuiting plate arranged at the short-circuit hole and a second connection plate covering at least a portion of the second short-circuit hole at an exterior side, the second connection plate being spaced apart from the cap plate and electrically connected to the second electrode terminal.

The first short-circuiting plate and the second short-circuiting plate may be brought into contact with the first connection plate and the second connection plate, respectively, when an internal pressure of the rechargeable battery exceeds a reference pressure.

Each of the first short-circuiting plate and the second short-circuiting plate may include a round part convexly extended toward the electrode assembly and an edge part fixed to the cap plate.

The rechargeable battery may further include a first upper insulation member between the first connection plate and the cap plate and including an open region corresponding to the first short-circuit hole, and a second upper insulation member between the second connection plate and the cap plate and including an open region corresponding to the second short-circuit hole.

The first short-circuiting plate and the second short-circuiting plate may be brought into surface contact with the first connection plate and the second connection plate, respectively, when an internal pressure of the rechargeable battery exceeds a reference pressure.

A surface of at least one of the first or second connection plate contacting the first or second short-circuiting plate may be concave or planar.

The rechargeable battery may further include at least one fuse part arranged at a current flow passage of the rechargeable battery.

According to an aspect of embodiments of the present invention, a rechargeable battery prevents or substantially prevents an internal pressure from excessively increasing due to internal factors, such as overcharge, and can prevent or substantially prevent a short due to external factors, such as perforation of an outer case. As such, a rechargeable battery according to embodiments of the present invention has improved safety and is suited for use as a motor-driving power source for propelling electric scooters, hybrid vehicles, or electric vehicles.

Additional aspects and/or advantages of the invention will be set forth in part in the description which follows and, in part, will be obvious from the description, or may be learned by practice of the invention.

BRIEF DESCRIPTION OF THE DRAWINGS

The above and other features and aspects of the present invention will become more apparent by describing in detail some exemplary embodiments thereof with reference to the attached drawings in which.

DETAILED DESCRIPTION

Some exemplary embodiments of the present invention will be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various ways, all without departing from the spirit or scope of the present invention.

Figure 1:
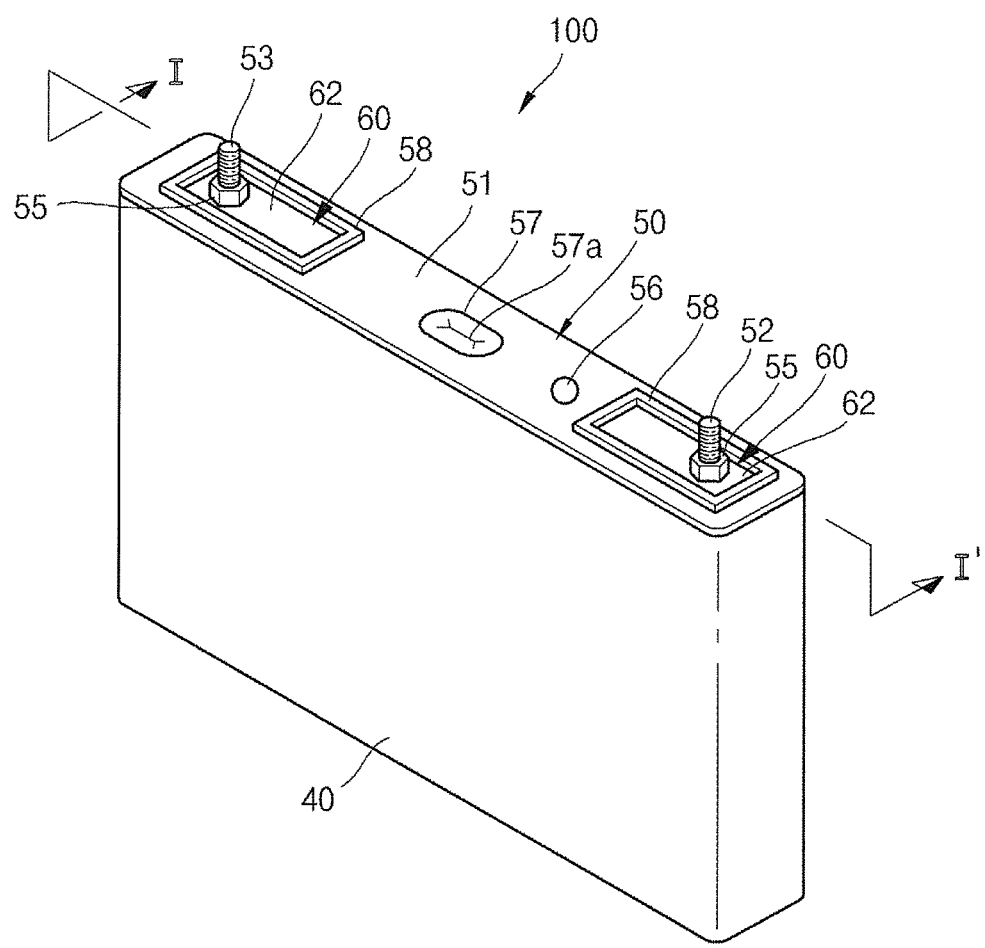
FIG. 1 is a perspective view of a rechargeable battery according to an embodiment of the present invention.
Figure 2:
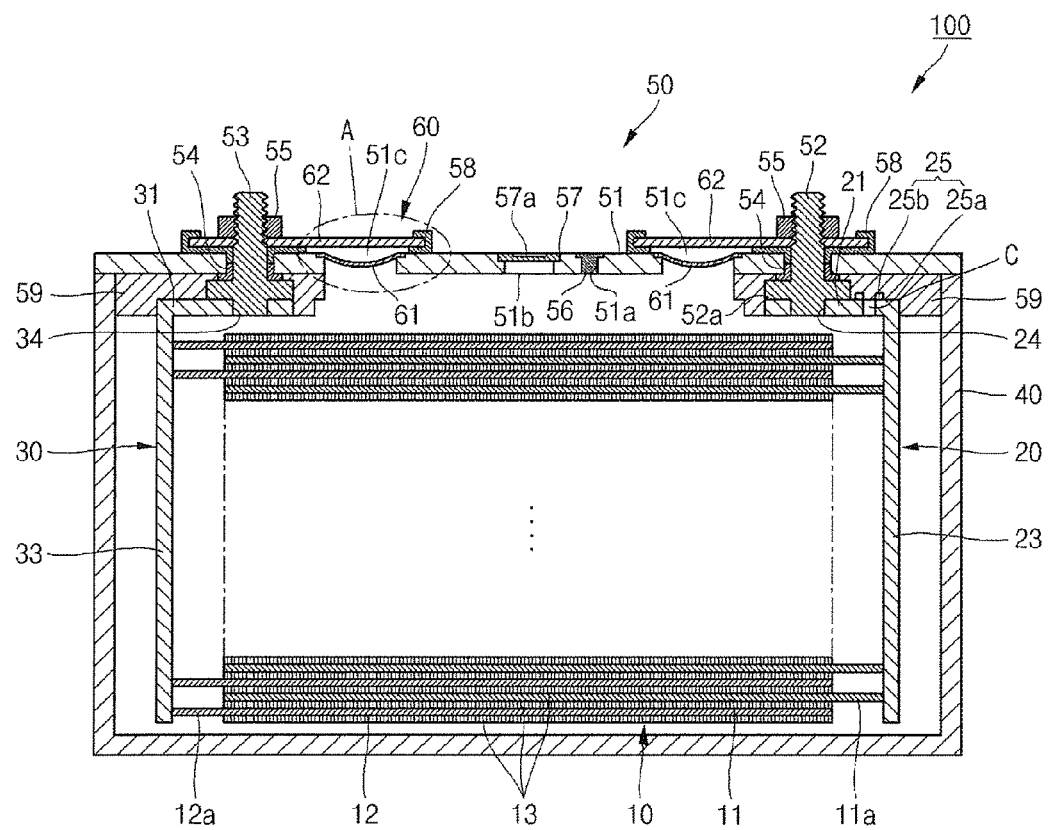
FIG. 2 is a cross-sectional view of the rechargeable battery of FIG. 1, taken along the line I-I'.
Figure 3A:
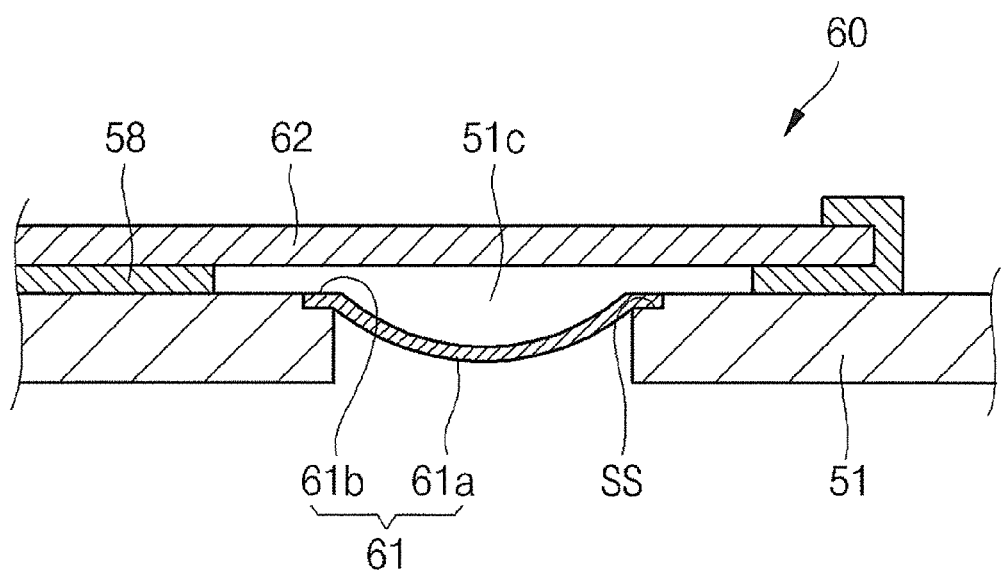
FIGS. 3A and 3B are enlarged views of a region 'A' of FIG. 2, respectively showing states before a short-circuiting plate of a short-circuiting member of the rechargeable battery of FIG. 1 is inverted, and after the short-circuiting plate is inverted.
Figure 3B:
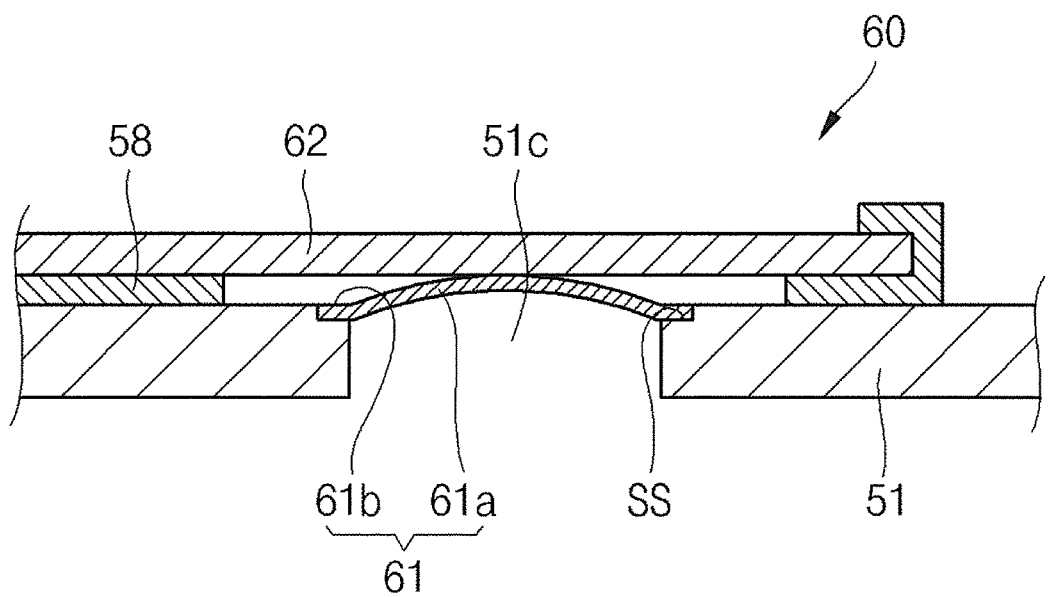

FIG. 1 is a perspective view illustrating a rechargeable battery 100 according to an embodiment of the present invention; FIG. 2 is a cross-sectional view of the rechargeable battery 100, taken along the line I-I' of FIG. 1; and FIG. 3A is an enlarged view of a region 'A' of FIG. 2, showing a short-circuiting member of the rechargeable battery 100 and illustrating a state before a short-circuiting plate of the short-circuiting member is inverted; and FIG. 3B illustrates a state after the short-circuiting plate of FIG. 3A is inverted.

Referring to FIGS. 1 and 2, the rechargeable battery 100 according to an embodiment of the present invention may include an electrode assembly 10, a first collecting plate 20, a second collecting plate 30, a case 40, a cap assembly 50, and short-circuiting members 60.

The electrode assembly 10 may be formed by winding or stacking a first electrode plate 11, a separator 13, and a second electrode plate 12, which have a thin plate or film shape. In one embodiment, the first electrode plate 11 may function as a positive electrode, and the second electrode plate 12 may function as a negative electrode. Alternatively, the first electrode plate 11 may function as a negative electrode, and the second electrode plate 12 may function as a positive electrode The first electrode plate 11 may be formed by applying a first electrode active material (e.g., a transition metal oxide) to a first electrode collector plate formed of a metal foil (e.g., aluminum) and may include a first electrode non-coating portion 11a to which the first electrode active material is not applied. The first electrode non-coating portion 11a may function as a current flow passage from the first electrode plate 11 to an outside of the first electrode plate 11. In embodiments of the present invention, materials that may be used to form the first electrode plate 11 are not limited to the above-mentioned materials.

The second electrode plate 12 may be formed by applying a second electrode active material (e.g., graphite or carbon) to a second electrode collector plate formed of a metal foil (e.g., nickel or copper) and may include a second electrode non-coating portion 12a to which the second electrode active material is not applied. The second electrode non-coating portion 12a may function as a current flow passage from the second electrode plate 12 to an outside of the second electrode plate 12. In embodiments of the present invention, materials that may be used to form the second electrode plate 12 are not limited to the above-mentioned materials.

The polarities of the first and second electrode plates 11 and 12 may be reversed with each other.

The separator 13 may be disposed between the first electrode plate 11 and the second electrode plate 12 to prevent or substantially prevent a short circuit and to facilitate movement of ions (e.g., lithium ions). The separator 13 may be formed of a polyethylene film, a polypropylene film, or a film including polyethylene and polypropylene. In other embodiments of the present invention, materials that may be used to form the separator 13 are not limited to the above-mentioned materials.

The first collecting plate 20 and the second collecting plate 30 may be coupled with lateral end parts of the electrode assembly 10 such that they are electrically connected to the first and second electrode plates 11 and 12, respectively.

The first collecting plate 20, in one embodiment, is made of a conductive material (e.g., aluminum) and contacts the first electrode non-coating portion 11a protruding from a lateral end of the electrode assembly 10 to be electrically connected to the first electrode non-coating portion 11a. The first collecting plate 20 may include a first connection part 21 and a first extension part 23, as shown in FIG. 2.

The first connection part 21 may be installed between a top surface of the electrode assembly 10 and a bottom surface of the cap assembly 50, and may be formed in a plate shape. The first extension part 23 may be bent from the first connection part 21 and may extend in a direction (e.g., a downward direction) at an angle from the first connection part 21.

The first extension part 23 may be bent from the end of the first connection part 21 and may extend therefrom. In one embodiment, the first extension part 23 may be shaped as a plate substantially contacting the first electrode non-coating portion 11a. Here, a corner at which the first connection part 21 and the first extension part 23 meet is denoted as "C" and, in one embodiment, the first connection part 21 and the first extension part 23 are perpendicular to each other about the corner "C."

In one embodiment, a first terminal hole 24 is formed at one side of the first connection part 21 and provides a space in the first connection part 21 into which a first electrode terminal 52 of the cap assembly 50 is inserted to be coupled thereto. In one embodiment, the first terminal hole 24 is positioned at a side of the first connection part 21 distant from the corner "C."

In one embodiment, a fuse part 25 is formed at an upper portion of the first collecting plate 20 (e.g., on the first connection part 21) so as not to contact an electrolyte. In one embodiment, the fuse part 25 is positioned at a region of the first connection part 21 to be adjacent to the corner C and to not overlap the first electrode terminal 52 coupled to the first terminal hole 24. In one embodiment, the fuse part 25 has a fuse hole 25a and a reinforcement protrusion 25b protruding around the fuse hole 25a. The fuse hole 25a may function to prevent or substantially prevent a current flow passage such that a region having the fuse hole 25a formed therein is melted by heat generated when a large amount of current flows in the rechargeable battery 100, such as due to a short circuit. The reinforcement protrusion 25b may function to reinforce the strength of the region having the fuse hole 25a formed therein, such as against external shocks, before a short circuit occurs to the rechargeable battery 100.

While FIG. 2 shows an embodiment in which the fuse part 25 is formed only in the first collecting plate 20, a location at which the fuse part 25 is formed is not limited thereto. Since the fuse part 25 functions to prevent or substantially prevent the flow of current when overcurrent may flow in the rechargeable battery 100, it may be operable so long as it is installed along the current flow passage of the rechargeable battery 100, and may be other than at the first collecting plate 20. In one embodiment, the fuse part 25 may be installed in the second collecting plate 30 rather than the first collecting plate 20, or may be installed in both the first collecting plate 20 and the second collecting plate 30.

The second collecting plate 30, in one embodiment, is formed of a conductive metal (e.g., nickel) and contacts the second electrode non-coating portion 12a protruding to the other lateral end part of the electrode assembly 10 to be electrically connected to the second electrode plate 12. The second collecting plate 30, in one embodiment, includes a second connection part 31, a second extension part 33, and a second terminal hole 34.

In the second collecting plate 30, the second connection part 31, the second extension part 33, and the second terminal hole 34 may be configured the same or similarly as the first connection part 21, the first extension part 23, and the first terminal hole 24 in the first collecting plate 20, and in view of same or similar configurations and functions, further descriptions of the second connection part 31, the second extension part 33, and the second terminal hole 34 are omitted.

The case 40 may be formed of a conductive metal (e.g., aluminum, aluminum alloy, or steel plated with nickel). The case 40 may have a generally hexahedral shape with an opening such that the electrode assembly 10, the first collecting plate 20, and the second collecting plate 30 may be inserted and accommodated in the case 40. While FIG. 2 shows a state in which the case 40 and the cap assembly 50 are assembled with each other and the opening is not illustrated in FIG. 2, a peripheral part of the case 40 is a part that is substantially open. In one embodiment, an interior surface of the case 40 may be insulated to be electrically insulated from the electrode assembly 10, the first collecting plate 20, the second collecting plate 30, and the cap assembly 50.

The cap assembly 50 is coupled to the case 40. In one embodiment, the cap assembly 50 may include a cap plate 51, the first electrode terminal 52, a second electrode terminal 53, a gasket 54, and a nut 55. In addition, in one embodiment, the cap assembly 50 may include a plug 56, a vent plate 57, an upper insulation member 58, and a lower insulation member 59.

The cap plate 51 may close the opening of the case 40 and, in one embodiment, may be formed of the same material as that used to form the case 40. The cap plate 51 may have an electrolyte injection hole 51a, a vent hole 51b, and a short-circuit hole 51c. In one embodiment, an internal surface of the short-circuit hole 51c may be formed stepwise and may have at least one stepped surface "SS" (see FIGS. 3A and 3B).

The first electrode terminal 52 passes through one side of the cap plate 51 to be electrically connected to the first collecting plate 20. The first electrode terminal 52 may be shaped as a pillar, and a thread may be formed along the outer circumferential surface of an upper part of the pillar exposed to a top portion of the cap plate 51. In one embodiment, a flange 52a may be formed at a lower part of the pillar positioned below the cap plate 51 to prevent or substantially prevent the first electrode terminal 52 from being dislodged from the cap plate 51. In one embodiment, a portion of the pillar positioned below the flange 52a of the first electrode terminal 52 is inserted into the first terminal hole 24 of the first collecting plate 20.

The second electrode terminal 53 passes through the other side of the cap plate 51 to be electrically connected to the second collecting plate 30. The second electrode terminal 53 may have a same or similar configuration as the first electrode terminal 52 and, therefore, further description thereof is omitted.

The gasket 54 is formed of an insulating material between each of the first electrode terminal 52 and the second electrode terminal 53 and the cap plate 51 to seal spaces between each of the first electrode terminal 52 and the second electrode terminal 53 and the cap plate 51.

The gasket 54 prevents or substantially prevents external moisture from permeating into the inside of the rechargeable battery 100 and prevents or substantially prevents an electrolyte contained in the rechargeable battery 100 from flowing out.

In one embodiment, the nut 55 is engaged with the thread formed at each of the first electrode terminal 52 and the second electrode terminal 53 to fix the first electrode terminal 52 and the second electrode terminal 53 to the cap plate 51, respectively.

The plug 56 seals the electrolyte injection hole 51a of the cap plate 51. In one embodiment, the vent plate 57 is installed in the vent hole 51b of the cap plate 51 and has a notch 57a configured to be opened at a pressure (e.g., a predetermined pressure).

The upper insulation member 58, in one embodiment, is inserted between each of the first electrode terminal 52 and the second electrode terminal 53 and the cap plate 51 and tightly contacts the cap plate 51 and the gasket 54. The upper insulation member 58, in one embodiment, insulates each of the first electrode terminal 52 and the second electrode terminal 53 from the cap plate 51. In one embodiment, the upper insulation member 58 may also insulate the connection plate 62 from the cap plate 51.

The lower insulation member 59 is formed between each of the first collecting plate 20 and the second collecting plate 30 and the cap plate 51 and prevents or substantially prevents an undesired internal short circuit between each of the first collecting plate 20 and the second collecting plate 30 and the cap plate 51.

As described above, the first electrode terminal 52 and the second electrode terminal 53 are insulated from the cap plate 51 by the gasket 54, the upper insulation member 58, and the lower insulation member 59. Thus, the case 40 and the cap plate 51 are maintained at an electrically neutral state. Therefore, the rechargeable battery 100 has safety in use because a likelihood of a short circuit due to a contact between the electrode assembly 10 and the case 40 or the cap plate 51 is reduced.

The short-circuiting members 60, in one embodiment, are installed at one side and an opposite side of the cap assembly 50, and induce a short circuit when an internal pressure of the rechargeable battery 100 exceeds a pressure (e.g., a predetermined or reference pressure), thereby allowing the fuse part 25 to stop the flow of current. In one embodiment, a first short-circuiting member 60 installed at one side of the cap assembly 50 has the same configuration and performs the same function as a second short-circuiting member 60 installed at the opposite side of the cap assembly 50. Therefore, the following description is provided with respect to the first short-circuiting member 60 (to be referred to as the short-circuiting member 60), which is positioned closer to the second electrode terminal 53 than to the first electrode terminal 52, and a description of the second short-circuiting member 60 is omitted.

Referring to FIGS. 3A and 3B, the short-circuiting member 60 may include a short-circuiting plate 61 and a connection plate 62, which are made of a conductive material.

The short-circuiting plate 61 is installed in the short-circuit hole 51c of the cap plate 51. The short-circuiting plate 61, in one embodiment, may be an invertible plate having a round part 61a convexly formed toward the electrode assembly 10 (see FIG. 3A), and an edge part 61b fixed to the stepped surface "SS" formed on the internal surface of the short-circuit hole 51c. When the internal pressure of the rechargeable battery 100 exceeds a pressure (e.g., a predetermined or reference pressure), the short-circuiting plate 61 is inverted to then convexly protrude away from the electrode assembly 10 (see FIG. 3B). In one embodiment, the short-circuiting plate 61 may be formed of aluminum, but is not limited thereto. If the short-circuiting plate 61 were formed to be too thin, it could be melted even before the fuse part 25 operates in an event of a short circuit, and the short circuit state could hardly be maintained. Conversely, if the short-circuiting plate 61 were excessively thick, it could not be inverted. Therefore, in one embodiment, the short-circuiting plate 61 may have a thickness of about 0.4 mm to about 0.6 mm. However, the thickness of the short-circuiting plate 61 is not limited thereto.

The connection plate 62 is installed to allow the second electrode terminal 53 to be inserted from an exterior side spaced apart from the cap plate 51 and extends to cover at least a portion of the short-circuit hole 51c. The connection plate 62 is electrically connected to the second electrode terminal 53. In one embodiment, the connection plate 62 may be formed of a flat plate and may be formed from copper, but is not limited thereto. If the connection plate 62 were formed to be too thin, it could be melted even before the fuse part 25 operates in an event of a short circuit, and the short circuit state could hardly be maintained. Therefore, in one embodiment, the connection plate 62 may have a thickness of about 1 mm or greater. However, the thickness of the connection plate 62 is not limited thereto.

As described above, when the rechargeable battery 100 is in a normal operating state, the first electrode terminal 52 and the second electrode terminal 53 are both insulated from the cap plate 51 such that the case 40 and the cap plate 51 are maintained at an electrically neutral state, thereby reducing risks due to a short circuit.

In addition, when the internal pressure of the rechargeable battery 100 rises to a certain pressure (e.g., a predetermined or reference pressure) or greater, the short-circuiting members 60 operate to allow the first electrode terminal 52 and the second electrode terminal 53 to be electrically connected to the cap plate 51, thereby operating the fuse part 25 and securing safety in use of the rechargeable battery 100.

Next, a rechargeable battery constructed according to another embodiment of the present invention will be described.

Figure 4A:
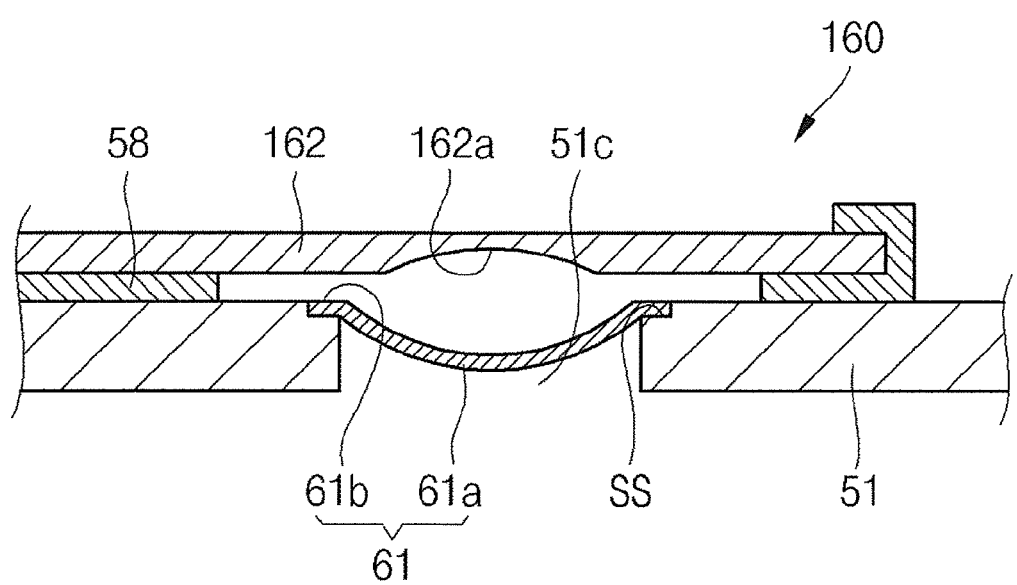
FIGS. 4A and 4B are partial cross-sectional views of a short-circuiting member of a rechargeable battery according to another embodiment of the present invention, respectively showing states before a short-circuiting plate of the short-circuiting member is inverted, and after the short-circuiting plate is inverted.
Figure 4B:
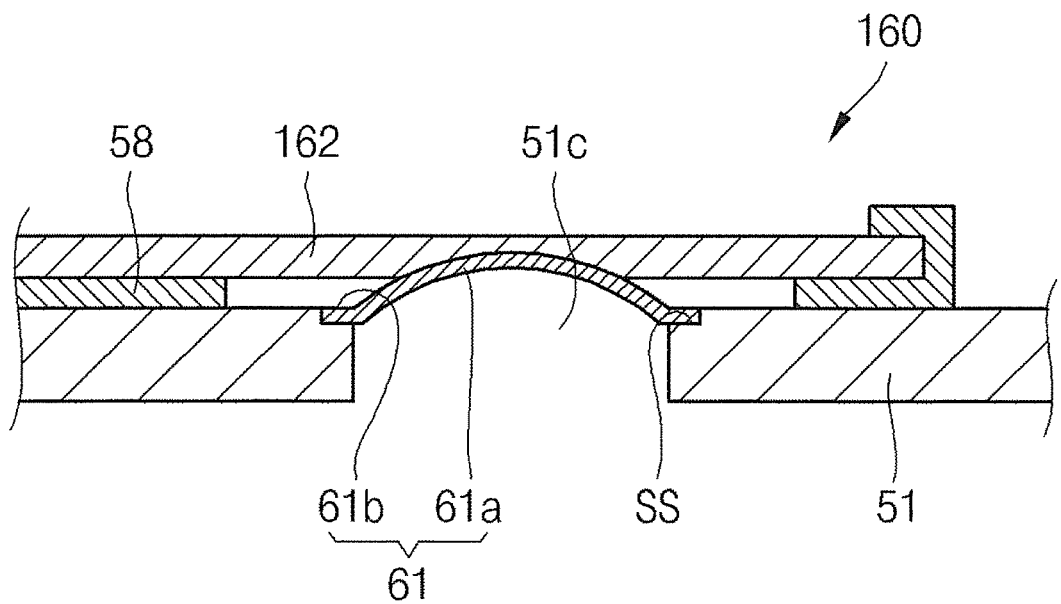

FIG. 4A is a partial cross-sectional view illustrating a portion of a short-circuiting member corresponding to the region 'A' of FIG. 2 of a rechargeable battery constructed according to another embodiment of the present invention, shown in a normal operating state; and FIG. 4B is a cross-sectional view illustrating a state in which a short-circuiting plate of the short-circuiting member shown in FIG. 4A is brought into contact with a connection plate.

The rechargeable battery is substantially the same as the rechargeable battery 100 shown in FIG. 2 in configuration and function, except that a configuration of a connection plate 162 of a short-circuiting member 160 is different from that of the connection plate 62 of the short-circuiting member 60 described above. Further description and illustration of the same components is omitted, and the following description focuses on the connection plate 162.

Referring to FIG. 4A, the short-circuiting member 160 of the rechargeable battery according to an embodiment of the present invention includes the short-circuiting plate 61 and the connection plate 162.

The connection plate 162 is substantially the same as the connection plate 62 described above and shown in FIG. 3A. However, the connection plate 162 shown in FIG. 4A has a surface 162a contacting the short-circuiting plate 61 when the short-circuiting plate 61 is inverted (see FIG. 4B), and concavely formed to correspond to the shape of the short-circuiting plate 61. As shown in FIG. 4B, the short-circuiting plate 61 and the connection plate 162 are brought into surface contact with each other, increasing a contact area, and thereby reducing contact resistance. Thus, a short circuit state may be maintained, and melting of the short-circuiting plate 61 and the connection plate 162 before the fuse part 25 operates may be prevented or substantially prevented. In addition, a large amount of current is allowed to flow, thereby allowing the fuse part 25 to operate definitely.

Next, a rechargeable battery constructed according to still another embodiment of the present invention will be described.

Figure 5A:
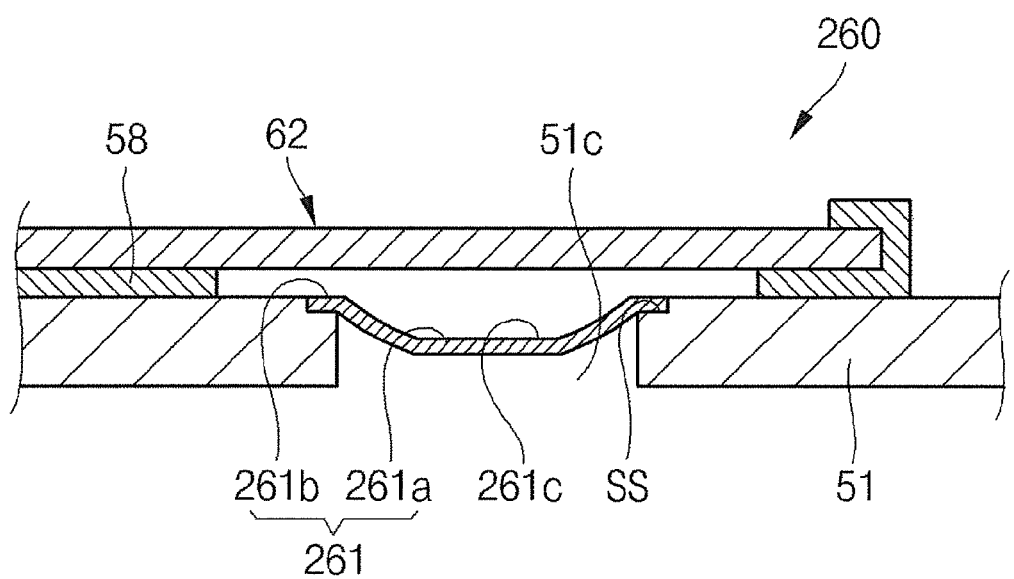
FIGS. 5A and 5B are partial cross-sectional views of a short-circuiting member of a rechargeable battery according to another embodiment of the present invention, respectively showing states before a short-circuiting plate of the short-circuiting member is inverted, and after the short-circuiting plate is inverted.
Figure 5B:
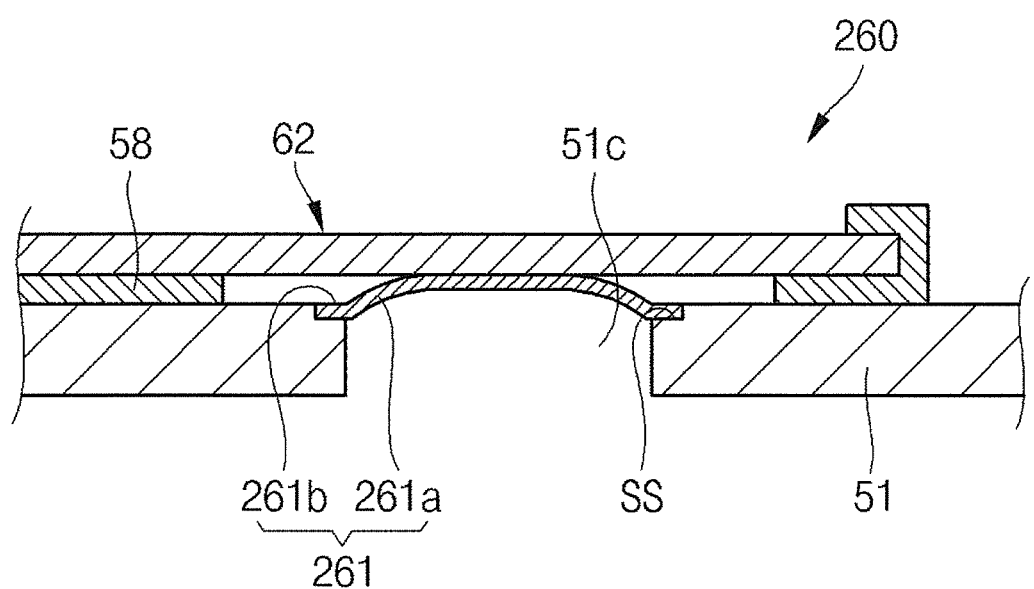

FIG. 5A is a partial cross-sectional view illustrating a portion of a short-circuiting member corresponding to the region 'A' of FIG. 2 of a rechargeable battery constructed according to another embodiment of the present invention, shown in a normal operating state; and FIG. 5B is a cross-sectional view illustrating a state in which a short-circuiting plate of the short-circuiting member shown in FIG. 5A is brought into contact with a connection plate.

The rechargeable battery is substantially the same as the rechargeable battery 100 shown in FIG. 2 in configuration and function, except that a configuration of a short-circuiting plate 261 of a short-circuiting member 260 is different from that of the short-circuiting plate 61 of the short-circuiting member 60 described above. Further description and illustration of the same components is omitted, and the following description focuses on the short-circuiting plate 261.

Referring to FIG. 5A, the short-circuiting member 260 of the rechargeable battery according to an embodiment of the present invention includes the short-circuiting plate 261 and the connection plate 62, which are made of a conductive material.

The short-circuiting plate 261 is substantially the same as the short-circuiting plate 61 shown in FIG. 3A. That is, the short-circuiting plate 261, in one embodiment, may be an invertible plate having a center part 261a formed toward the electrode assembly 10 (see FIG. 5A), and an edge part 261b fixed to the stepped surface "SS" formed on the internal surface of the short-circuit hole 51c. However, the center part 261a of the short-circuiting plate 261 has a surface 261c contacting the connection plate 62 when it is inverted (see FIG. 5B) that is flatly formed, or planar, to correspond to the shape (e.g., a planar shape) of the connection plate 62. As shown in FIG. 5B, the short-circuiting plate 261 and the connection plate 62 are brought into surface contact with each other, increasing a contact area, and thereby reducing contact resistance. Thus, a short circuit state may be maintained, and melting of the short-circuiting plate 261 and the connection plate 62 before the fuse part 25 operates may be prevented or substantially prevented. In addition, a large amount of current is allowed to flow, thereby allowing the fuse part 25 to operate definitely.

While the present invention has been particularly shown and described with reference to some exemplary embodiments thereof, it will be understood by those of ordinary skill in the art that various changes in form and details may be made therein without departing from the spirit and scope of the present invention as set forth in the following claims.

What is claimed is:

1. A rechargeable battery comprising:
    an electrode assembly;
    a case housing the electrode assembly;
    a cap assembly comprising a cap plate having a short-circuit hole and sealing an opening of the case; and
    a short-circuiting member comprising a short-circuiting plate arranged at the short-circuit hole and a connection plate covering at least a portion of the short-circuit hole at an exterior side, the connection plate being spaced apart from the cap plate and electrically connected to the electrode assembly,
    wherein the case and the cap assembly are electrically insulated from the electrode assembly.

2. The rechargeable battery of claim 1, wherein the electrode assembly comprises a first electrode plate and a second electrode plate, the short-circuiting member is a first short-circuiting member arranged at one side of the cap plate, and the rechargeable battery further comprises a second short-circuiting member arranged at an opposite side of the cap plate.

3. The rechargeable battery of claim 1, wherein the short-circuiting plate is brought into contact with the connection plate when an internal pressure of the rechargeable battery exceeds a reference pressure.

4. The rechargeable battery of claim 1, wherein the short-circuiting plate is an invertible plate comprising a round part convexly extended toward the electrode assembly and an edge part fixed to the cap plate.

5. The rechargeable battery of claim 1, further comprising an upper insulation member between the connection plate and the cap plate and including an open region corresponding to the short-circuit hole.

6. The rechargeable battery of claim 1, wherein the short-circuiting plate is brought into surface contact with the connection plate when an internal pressure of the rechargeable battery exceeds a reference pressure.

7. The rechargeable battery of claim 6, wherein a surface of the connection plate contacting the short-circuiting plate is concave.

8. The rechargeable battery of claim 6, wherein a surface of the connection plate contacting the short-circuiting plate is planar.

9. The rechargeable battery of claim 1, further comprising at least one fuse part arranged at a current flow passage of the rechargeable battery.

10. A rechargeable battery comprising:
    an electrode assembly comprising a first electrode plate and a second electrode plate;
    a case housing the electrode assembly;
    a cap assembly comprising a cap plate including a first electrode terminal electrically connected to the first electrode plate, a second electrode terminal electrically connected to the second electrode plate, a first short-circuit hole, and a second short-circuit hole, the cap plate sealing an opening of the case and being electrically insulated from the first electrode terminal and the second electrode terminal;
    a first short-circuiting member comprising a first short-circuiting plate arranged at the first short-circuit hole and a first connection plate covering at least a portion of the first short-circuit hole at an exterior side, the first connection plate being spaced apart from the cap plate and electrically connected to the first electrode terminal; and
    a second short-circuiting member comprising a second short-circuiting plate arranged at the short-circuit hole and a second connection plate covering at least a portion of the second short-circuit hole at an exterior side, the second connection plate being spaced apart from the cap plate and electrically connected to the second electrode terminal.

11. The rechargeable battery of claim 10, wherein the first short-circuiting plate and the second short-circuiting plate are brought into contact with the first connection plate and the second connection plate, respectively, when an internal pressure of the rechargeable battery exceeds a reference pressure.

12. The rechargeable battery of claim 10, wherein each of the first short-circuiting plate and the second short-circuiting plate includes a round part convexly extended toward the electrode assembly and an edge part fixed to the cap plate.

13. The rechargeable battery of claim 10, further comprising:
    a first upper insulation member between the first connection plate and the cap plate and including an open region corresponding to the first short-circuit hole; and
    a second upper insulation member between the second connection plate and the cap plate and including an open region corresponding to the second short-circuit hole.

14. The rechargeable battery of claim 10, wherein the first short-circuiting plate and the second short-circuiting plate are brought into surface contact with the first connection plate and the second connection plate, respectively, when an internal pressure of the rechargeable battery exceeds a reference pressure.

15. The rechargeable battery of claim 14, wherein a surface of at least one of the first or second connection plate contacting the first or second short-circuiting plate is concave.

16. The rechargeable battery of claim 14, wherein a surface of at least one of the first or second connection plate contacting the first or second short-circuiting plate is planar.

17. The rechargeable battery of claim 10, further comprising at least one fuse part arranged at a current flow passage of the rechargeable battery.

* * * * *